US012506267B2

(12) United States Patent
Lin et al.

(10) Patent No.: US 12,506,267 B2
(45) Date of Patent: Dec. 23, 2025

(54) RF FRONT-END MODULE FOR MILLIMETER-WAVE RADAR

(71) Applicant: Airtouch Intelligent Technology (Shanghai) Co., Ltd., Shanghai (CN)

(72) Inventors: Shuiyang Lin, Shanghai (CN); Ying Song, Shanghai (CN); Jiabao Niu, Shanghai (CN)

(73) Assignee: Airtouch Intelligent Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/976,272

(22) Filed: Dec. 10, 2024

(65) Prior Publication Data

US 2025/0309540 A1    Oct. 2, 2025

(30) Foreign Application Priority Data

Mar. 26, 2024   (CN) .......................... 202410346744.2

(51) Int. Cl.
*H01Q 9/04*   (2006.01)
*G01S 7/03*   (2006.01)

(52) U.S. Cl.
CPC ........... *H01Q 9/0407* (2013.01); *G01S 7/032* (2013.01)

(58) Field of Classification Search
None
See application file for complete search history.

(56) References Cited

U.S. PATENT DOCUMENTS

| 8,665,142 B2 * | 3/2014 | Shijo ......................... G01S 7/03 342/175 |
| 10,431,895 B2 * | 10/2019 | Chung ..................... H01Q 1/50 |
| 11,867,832 B2 * | 1/2024 | Vanwiggeren ........ G01S 13/931 |
| 2002/0163478 A1 * | 11/2002 | Pleva ................. H01Q 21/0043 343/700 MS |
| 2011/0316734 A1 * | 12/2011 | Svensson ................. H01Q 9/16 342/175 |
| 2019/0379132 A1 * | 12/2019 | Pelletti ................. H01Q 9/0457 |

(Continued)

FOREIGN PATENT DOCUMENTS

| CN | 201498598 U | 6/2010 |
| CN | 104167578 A | 11/2014 |

(Continued)

*Primary Examiner* — Peter M Bythrow
(74) *Attorney, Agent, or Firm* — IPRTOP LLC

(57) ABSTRACT

An RF front-end module for a millimeter-wave radar is provided. By placing at least one receiving channel and at least one transmitting channel between two metal plates, both RF-connected to the chip and surrounded by several metalized through holes, and arranging several antenna slot gaps corresponding to each receiving and transmitting channel on the upper metal plate, the RF front-end module of the present disclosure offers wider beamwidth, larger reflection coefficient bandwidth, symmetrical radiation patterns, and a larger field of view, enabling advantages such as stable matching, efficient transmission, accurate targeting, and broad monitoring areas, especially suitable for high-precision, wide-angle radar antenna applications. Existing patch microstrip antennas are limited by size and simple structure and cannot achieve these effects. It's difficult to design a broadside antenna radar module with wide bandwidth, high performance, and a wide field of view using conventional patch microstrip antennas.

7 Claims, 5 Drawing Sheets

(56) References Cited

U.S. PATENT DOCUMENTS

| | | | |
|---|---|---|---|
| 2020/0028259 A1* | 1/2020 | Wang | G01S 13/584 |
| 2020/0058987 A1* | 2/2020 | Pelletti | G01S 13/931 |
| 2020/0059007 A1* | 2/2020 | Wang | H01Q 13/18 |
| 2020/0266543 A1* | 8/2020 | Kaushal | H01Q 3/36 |
| 2020/0313288 A1* | 10/2020 | Kona | H01Q 13/20 |
| 2020/0335873 A1* | 10/2020 | Achour | H01Q 5/371 |
| 2020/0350696 A1* | 11/2020 | Zhu | H01Q 21/0006 |
| 2021/0028549 A1* | 1/2021 | Doyle | H01Q 21/005 |
| 2021/0167518 A1* | 6/2021 | Achour | H01Q 21/005 |
| 2021/0210857 A1* | 7/2021 | Sayama | H01Q 9/0457 |
| 2021/0359415 A1* | 11/2021 | Takaki | H01Q 21/28 |
| 2022/0247065 A1 | 8/2022 | Zhu et al. | |
| 2024/0243482 A1* | 7/2024 | Xue | H01Q 13/10 |

FOREIGN PATENT DOCUMENTS

| | | |
|---|---|---|
| CN | 107369917 A | 11/2017 |
| CN | 109286081 A | 1/2019 |
| CN | 113612026 A | 11/2021 |
| CN | 214706247 U | 11/2021 |
| CN | 114937860 A | 8/2022 |
| CN | 116454622 A | 7/2023 |
| CN | 117673037 A | 3/2024 |
| CN | 220604985 U | 3/2024 |

\* cited by examiner

RF FRONT-END MODULE FOR MILLIMETER-WAVE RADAR

FIELD OF THE INVENTION

The present disclosure relates to the technical field of radars, and in particular, to an RF front-end module for a millimeter-wave radar.

BACKGROUND OF THE INVENTION

In the current radar field, millimeter-wave technology has become a key focus and has gained widespread attention. Due to the shorter wavelength of millimeter waves, smaller antennas can be designed. Consequently, connecting the antenna to an active chip to form a module has become the main approach to realizing millimeter-wave systems. As shown in FIG. 1, a commonly used radar front-end module solution in existing technology employs a patch microstrip antenna, connecting the active millimeter-wave chip to the patch microstrip antenna, feeding the antenna through the chip to achieve normal system operation. When using a thinner microstrip antenna substrate, the impedance frequency bandwidth is significantly limited, typically achieving only 1% to 3% impedance bandwidth. On the other hand, while a thicker microstrip antenna substrate can achieve a wider bandwidth, it increases asymmetry, causing the module antenna's radiation pattern to exhibit asymmetry or even severe distortion. As a result, the module's field of view is reduced, with the −3 dB beamwidth of the radiation pattern being about 70 to 80 degrees. This is due to the small size of the patch microstrip antenna, losses caused by the substrate material, low radiation efficiency, and impedance matching issues, leading to limited bandwidth. Therefore, it is challenging to achieve a wide bandwidth through the reasonable design of the patch microstrip antenna.

Therefore, although the millimeter-wave band has a wide bandwidth, the size limitations of the radar front-end module, especially the small profile height limitation, make it difficult to design a broadside antenna radar module with wide bandwidth, high performance, and a wide field of view using a patch microstrip antenna. This limitation affects the performance and functionality of the radar system, ultimately impacting its effectiveness and reliability in various application scenarios.

SUMMARY OF THE INVENTION

In view of the above-mentioned shortcomings, the present disclosure provides an RF front-end module for a millimeter-wave radar, which overcomes the size limitations of existing patch microstrip antenna radar modules, enabling the design of a broadside antenna radar module with wide bandwidth, high performance, and a wide field of view.

A first embodiment of the present disclosure provides an RF front-end module for a millimeter-wave radar. The RF front-end module comprises a chip and an antenna unit. The antenna unit comprises an upper metal plate and a lower metal plate. One or more receiving channels and one or more transmitting channels are disposed between the upper metal plate and the lower metal plate, and at least one of the receiving channels corresponds to one of the transmitting channels. The receiving channels and the transmitting channels are RF-connected to the chip to respectively receive and transmit RF signals. Each of the receiving channels and the transmitting channels is surrounded by metalized through holes, and each of the metalized through holes penetrates the upper metal plate and the lower metal plate. For each of the receiving channels and the transmitting channels, a subset of the metalized through holes forms an integrated waveguide structure surrounding said channel. The upper metal plate is provided with antenna slot gaps, and each of the antenna slot gaps corresponds to one of the receiving channels and the transmitting channels.

In some examples of the present disclosure, for each receiving channel, a center point of a corresponding antenna slot gap does not coincide with a symmetry axis of the integrated waveguide structure surrounding the receiving channel, and/or, for each transmitting channel, a center point of a corresponding antenna slot gap does not coincide with a symmetry axis of the integrated waveguide structure surrounding the transmitting channel.

In some examples of the present disclosure, antenna slot gaps respectively corresponding to one of the receiving channels and its corresponding transmitting channel have a same main-axis direction.

In some examples of the present disclosure, at least one of the receiving channels comprises a plurality of antenna slot gaps, the plurality of antenna slot gaps are disposed in a staggered manner on two sides of the symmetry axis of the integrated waveguide structure surrounding the receiving channel, and/or, at least one of the transmitting channels comprises a plurality of antenna slot gaps, the plurality of antenna slot gaps are disposed in a staggered manner on two sides of the symmetry axis of the integrated waveguide structure surrounding the transmitting channel.

In some examples of the present disclosure, antenna slot gaps of one of the receiving channels and its corresponding transmitting channel are mirror-symmetrical.

In some examples of the present disclosure, for each of the receiving channels and the transmitting channels, a distance between a center point of an antenna slot gap at a tail end of said channel and the metalized through holes at the tail end of said channel is one-half of a waveguide wavelength of the integrated waveguide structure surrounding said channel.

In some examples of the present disclosure, a distance between two adjacent metalized through holes is one fourth of a waveguide wavelength of the integrated waveguide structure surrounding said channel.

In some examples of the present disclosure, the antenna slot gaps comprise one or more of rectangular slot gaps, elliptical slot gaps, pentagonal slot gaps, and hexagonal slot gaps.

In some examples of the present disclosure, the channels are RF-connected to the chip by a GSG RF connection or a GS RF connection.

A second embodiment of the present disclosure provides a radar system. The radar system comprises a power supply unit and an RF front-end module, and the front-end module is an RF front-end module for a millimeter-wave radar as described in any one of the examples provided in the first embodiment of the present disclosure.

The presently disclosed RF front-end module has the following beneficial effects: The RF front-end module provides a wider beamwidth, a larger reflection coefficient bandwidth, symmetrical radiation patterns, and a broader field of view, delivering benefits such as stable matching, efficient transmission, precise targeting, and extensive monitoring capabilities, making the module particularly suited for scenarios demanding wide bandwidth, including high-speed communication, radar systems, spectrum monitoring, medical imaging, and radio frequency spectrum utilization, ensuring higher performance and functionality requirements. Traditional patch microstrip antennas, with their narrow bandwidth, low radiation efficiency, difficult impedance matching, and susceptibility to environmental influences, fall short of achieving above benefits. Therefore, the RF front-end module of the present disclosure resolves the challenges associated with designing a broadside antenna radar module with wide bandwidth, high performance, and a wide field of view using conventional patch microstrip antennas.

REFERENCE NUMERALS

Figure 1:
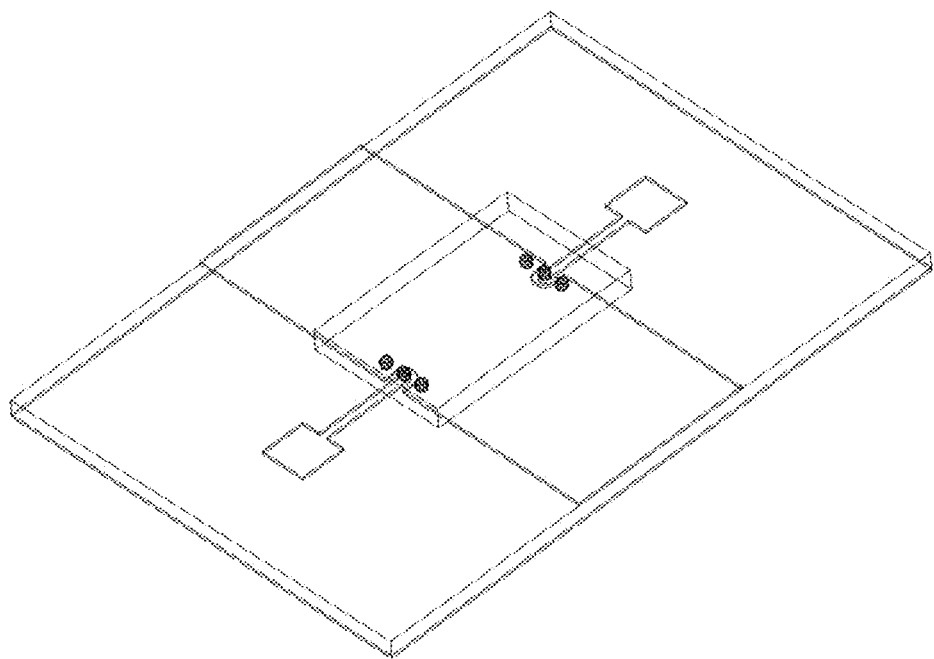
FIG. 1 is a schematic structural diagram of a patch microstrip radar antenna in the prior art.

1 Chip
2 Upper metal plate
3 Lower metal plate
4 Metalized through hole
5 BGA ball
6 Transition line
7 Antenna slot gap

DETAILED DESCRIPTION OF THE INVENTION

The embodiments of the present disclosure will be described below. Those skilled can easily understand other advantages and effects of the present disclosure according to contents disclosed by the specification. The present disclosure can also be implemented or applied through other different specific embodiments. Various details in this specification can also be modified or changed based on different viewpoints and disclosures without departing from the spirit of the present disclosure. It should be noted that the following embodiments and features of the following embodiments can be combined with each other if no conflict will result.

In the following description, referring to the accompanying drawings, which describe several embodiments of the present disclosure. It should be understood that other embodiments may be used and that changes in mechanical composition, structure, electrical, and operation may be made without departing from the scope of the present disclosure. The following detailed description should not be considered limiting, and the scope of the embodiments of the present disclosure is restricted only by the claims of the patents. The terms used herein are only intended to describe specific embodiments and are not intended to restrict the present disclosure. Spatially related terms, such as "upper", "lower", "left", "right", "downward", "below", "bottom", "above", "top", etc., can be used in the text for ease of explanation of the relationship between one element or feature and another element or feature shown in the figure.

In the present disclosure, unless otherwise expressly specified, terms such as "installation", "connection", "coupling", "fixing", and "holding" should be broadly understood. For example, when one element is referred to as being "connected to" another element, one element may be fixedly connected to or detachably connected to another element, may be mechanically connected to or electrically connected to another element, may be directly connected to another element, or may be indirectly connected to another element with another element interposed therebetween. These two elements may also communicate with each other internally. Those of ordinary skill in the art can understand the specific meanings of the above terms in the present disclosure according to specific situations.

Furthermore, as used herein, the singular forms "one", "a/an" and "the" are intended to include the plural form, unless the context indicates otherwise. It should be further understood that the terms "include" and "comprise" indicate the existence of the described features, steps, operations, elements, components, items, categories, and/or groups, but do not exclude the existence, presence, or addition of one or more other features, steps, operations, elements, components, items, categories, and/or groups. As used herein, the terms "or" and "and/or" are inclusive, and are used to include any of the associated listed items and all combinations thereof. Thus, "A, B or C" or "A, B and/or C" means "any of the following: A; B; C; A and B; A and C; B and C; A, B and C". Exceptions to this definition apply only when combinations of elements, functions or operations are inherently paradoxical in some way.

The present disclosure provides an RF front-end module for a millimeter-wave radar, which overcomes the size limitations of existing patch microstrip antenna radar modules, enabling the design of a broadside antenna radar module with wide bandwidth, high performance, and a wide field of view. In order to make the inventive purpose, technical solutions and beneficial technical effects of the present disclosure clearer, the present disclosure is described in further detail below through the following embodiments in conjunction with the accompanying drawings. It should be noted that the specific embodiments described herein are only illustrative and are not intended to restrict the present disclosure.

Before diving into the detailed description, terms and concepts involved in embodiments of the present disclosure are explained as follows:

<1> Millimeter-wave radar: A radar system that operates in the millimeter-wave frequency band (typically 30 GHz to 300 GHz) for detection and ranging; it offers high resolution and strong anti-interference capabilities; in general commercial use, frequency bands centered around 24 GHz to 30 GHz are often also classified as millimeter-wave.

<2> RF front-end module: A module that integrates RF signal processing, modulation and demodulation, and filtering functions, used for receiving and transmitting RF signals.

<3> Metalized through hole: A hole in a printed circuit board (PCB) that is plated with metal or filled with conductive material to connect different circuit layers; the metal plating on the hole sidewalls can include, but is not limited to, copper; the filling material can include, but is not limited to, metals or resin-like non-metals, used for signal transmission and electrical connection in multilayer PCBs.

<4> Antenna slot gap: A slot or gap in the antenna structure that alters its radiation characteristics, used for adjusting the antenna's frequency and directivity.

<5> Integrated waveguide: A technique that integrates waveguide structures into microwave circuits to achieve microwave signal transmission and coupling.

<6> Beamwidth: The coverage area of the beam in space, describing the coverage capacity of radar or communication systems.

<7> Reflection coefficient: The transmission performance of an RF device, circuit, transmission line, or certain structures within a specific frequency range, used to describe the characteristics of electromagnetic wave transmission in the circuit, transmission line, or RF device.

<8> Patch microstrip antenna: An antenna made using microstrip line technology on a surface of a substrate, commonly used in RF communication and antenna arrays.

<9> Antenna radiation pattern: The distribution of radiated energy from an antenna, used to analyze the antenna's radiation characteristics and directivity; an electric field radiation pattern is the pattern determined by the electric field vector and the main radiation direction vector.

<10> BGA packaging: Ball Grid Array packaging technology for chips, characterized by high density and high reliability.

<11> QFN packaging: Quad Flat No-lead packaging technology for chips, mounted on the PCB surface by soldering.

<12> SON packaging: Small Outline No-lead packaging technology for chips, often used for RF and microwave devices, characterized by small size and stable performance.

Structurally, the RF front-end module for the millimeter-wave radar of the present disclosure comprises a chip and a circuit board, with an antenna structure integrated into the circuit board. Embodiments of the present disclosure does not restrict the structure or number of layers of the circuit board(s) in the RF front-end module; the layering and structure of the circuit board can be adapted based on actual usage scenarios.

In the following, the RF front-end module for the millimeter-wave radar of the present disclosure will be described in detail with attached drawings and corresponding embodiments.

Figure 2:
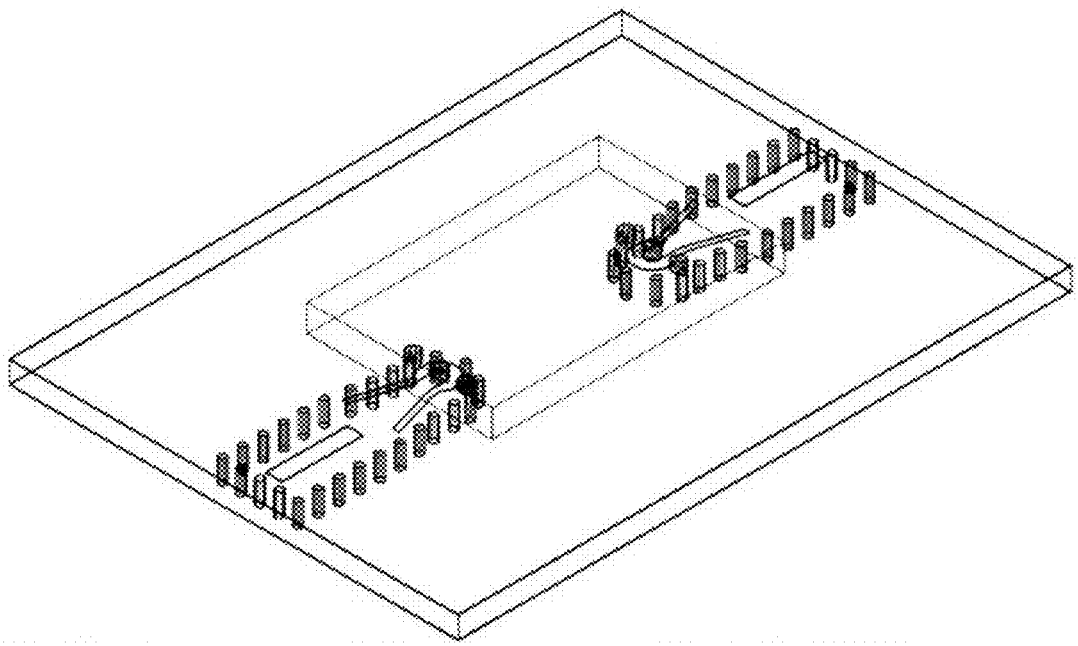
FIG. 2 is a schematic structural diagram of an RF front-end module for a millimeter-wave radar according to an embodiment of the present disclosure.
Figure 3:
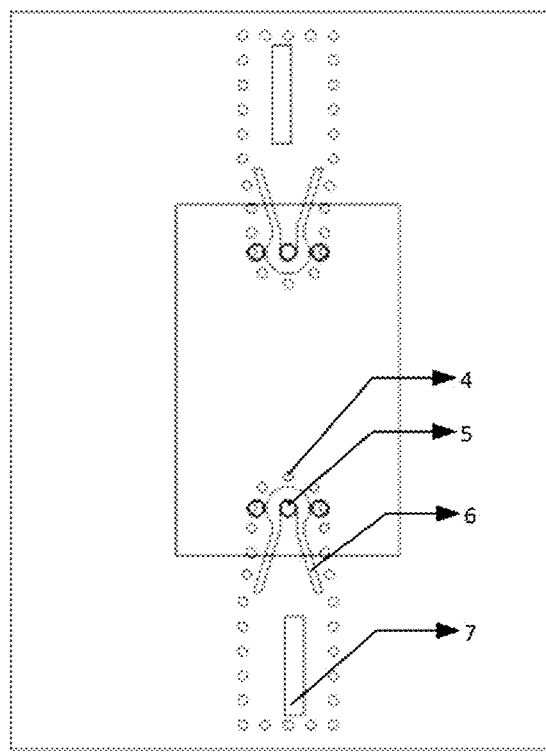
FIG. 3 is a top view of the RF front-end module for the millimeter-wave radar according to the embodiment of the present disclosure.
Figure 4:
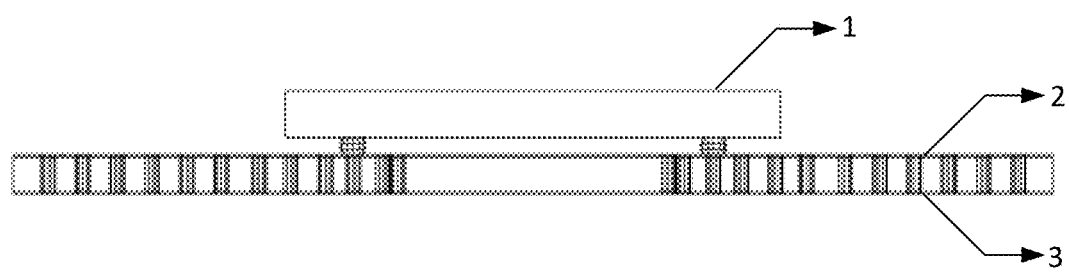
FIG. 4 is a cross-sectional view of the RF front-end module for the millimeter-wave radar according to the embodiment of the present disclosure.

FIGS. 2, 3 and 4 are schematic structural diagrams of an RF front-end module for a millimeter-wave radar according to an embodiment of the present disclosure. The RF front-end module comprises a chip 1 and an antenna unit (not labeled). The antenna unit comprises an upper metal plate 2 and a lower metal plate 3. One or more receiving channels (not shown) and one or more transmitting channels (not shown) are disposed between the upper metal plate 2 and the lower metal plate 3, and at least one of the receiving channels corresponds to one of the transmitting channels. It should be understood that each of the receiving channels herein refer to a structure composed of RF transmission lines, waveguide, and antenna used for reception purposes. This structure receives RF energy from space, transfers the RF energy through the antenna to the RF transmission lines or waveguide, then through RF circuit and chip, and finally transmits the RF energy to the receiver in the chip for processing. The RF signals are transmitted as if it were in a channel. Similarly, the transmitting channels in this context refer to the structure composed of RF transmission lines, waveguide, and antenna used for transmission purposes. This structure transfers the RF signals originating from the transmitter in the chip through RF transmission lines and waveguide to the transmitting antenna, and finally transmits the RF signals into space for propagation. The RF signals are transmitted as if it were in a channel. The receiving channels and the transmitting channels are RF-connected to the chip 1 to respectively receive and transmit RF signals. Each of the receiving channels and the transmitting channels is surrounded by metalized through holes 4, and each of the metalized through holes 4 penetrates the upper metal plate 2 and the lower metal plate 3. For each of the receiving channels and the transmitting channels, a subset of the metalized through holes 4 forms an integrated waveguide structure surrounding said channel. The upper metal plate 2 is provided with antenna slot gaps 7, and each of the antenna slot gaps 7 corresponds to one of the receiving channels and the transmitting channels.

It is worth noting that, in the present disclosure, several metalized through holes 4 are independently designed to surround each of the channels. This independent arrangement prevents interference between channels, thereby preserving antenna performance. In existing technology, shared metalized through holes can lead to mutual interference between antenna units, resulting in issues such as frequency detuning, radiation pattern distortion, and increased intermodulation. Each antenna unit having its own metalized through holes ensures that each antenna unit can operate independently. Independent metalized through holes for each antenna unit ensure operation within the designed frequency range, reducing mutual influence and improving system reliability and performance.

In one embodiment of the present disclosure, the chip 1 comprises active RF components of the radar. The functions that the chip 1 can achieve comprise power amplification and low noise amplification. The chip 1 comprises receiving ports and transmitting ports and is encapsulated through chip 1 packaging. The packaging methods for the chip 1 comprise one or more of BGA packaging, QFN packaging, and SON packaging.

In one embodiment of the present disclosure, the upper metal plate 2 and the lower metal plate 3 can be made of metals such as copper.

In one embodiment of the present disclosure, the channels are RF-connected to the chip by a GSG RF connection or a GS RF connection. As exemplified in FIGS. 2, 3, and 4, the ports for RF connection between the chip 1 and the antenna unit use a Ground-Signal-Ground (GSG) configuration to feed the antenna. In this setup, there are three BGA balls (or, BGA solder balls) 5: the one in the middle represents the signal line, and the ones on the sides represent the ground lines, enabling signal transmission. The GSG RF connection effectively reduces crosstalk and interference during signal transmission, enhancing signal stability and reliability.

Furthermore, in one example as shown in FIG. 3, when using BGA packaging, the BGA balls 5 can be soldered onto the antenna unit's receiving and transmitting channels to establish communicative connections. Alternatively, the chip 1 can be connected to the antenna unit through wires or pins, with outward transmission through a transition line 6. The transition line 6 may be a quasi-coplanar waveguide structure with ground on both sides or one side, allowing easy connection to GSG or GS structures and feeding the antenna.

In one embodiment of the present disclosure, the receiving channels and the transmitting channels in the antenna unit are RF-connected to the receiving ports and the transmitting ports of the chip 1, respectively. Specifically, after receiving the RF signals, the receiving channels in the antenna unit transmit the RF signals between the upper metal plate 2 and the lower metal plate 3 through the transition line 6, which has an RF transmission line on one end and a trapezoidal transition transmission line on the other, achieving impedance matching and signal transmission. The RF signals are then transmitted to the integrated waveguide structures formed by the metalized through holes 4.

Additionally, at a tail end of each of the receiving channels and the transmitting channels, a row of metalized through holes 4 is arranged to block the integrated waveguide structure surrounding said channel, limiting the propagation range of electromagnetic waves, reducing waveguide loss, and improving waveguide transmission efficiency, thereby enhancing antenna accuracy and radar performance.

In one embodiment of the present disclosure, for each of the receiving channels and the transmitting channels, a distance between a center point of an antenna slot gap 7 at a tail end of said channel and the metalized through holes 4 at the tail end of said channel is one-half of a waveguide wavelength of the integrated waveguide structure surrounding said channel.

In one embodiment of the present disclosure, a distance between two adjacent metalized through holes 4 is one fourth of a waveguide wavelength of the integrated waveguide structure surrounding said channel. Experimental results show that designing the distance between the two adjacent metalized through holes 4 to be a quarter of the waveguide wavelength effectively prevents interference and interaction between the adjacent metalized through holes 4, achieving the electromagnetic compatibility performance of the circuit board, fully preventing internal electromagnetic energy leakage, and ensuring that the electromagnetic field is transmitted along a predetermined path.

It should be noted that, as described in the above embodiments, the distance between the center point of the antenna slot gap 7 at the tail end of one channel and the metalized through holes 4 at the tail end of said channel is one-half of a waveguide wavelength of the integrated waveguide structure surrounding said channel, and the distance between two adjacent metalized through holes 4 is one fourth of the waveguide wavelength of the integrated waveguide structure surrounding said channel; however, in actual industrial production, wavelength fluctuations due to bandwidth variations necessitate redesigning the position of the center point of the antenna slot gap 7 at the tail end of each channel, as well as the distance between adjacent metalized through holes 4. The described positions are only the optimal values under ideal conditions and do not restrict the position of the center point of the antenna slot gap 7 at the tail end of each channel, as well as the distance between adjacent metalized through holes 4.

In one embodiment of the present disclosure, for each receiving channel, a center point of a corresponding antenna slot gap does not coincide with a symmetry axis of the integrated waveguide structure surrounding the receiving channel, and/or, for each transmitting channel, a center point of a corresponding antenna slot gap does not coincide with a symmetry axis of the integrated waveguide structure surrounding the transmitting channel.

It should be emphasized that the center point of the antenna slot gap 7 is positioned to either the left or right side of the symmetry axis of the integrated waveguide structure, rather than coinciding with the symmetry axis of the integrated waveguide structure. When the center point of the antenna slot gap 7 is positioned on the symmetry axis of the integrated waveguide structure, the centered gaps do not disrupt the internal current path, making the integrated waveguide structure non-radiative. As a result, the integrated waveguide structure cannot easily radiate electromagnetic energy, thereby weakening the performance of the radar antenna.

In one embodiment of the present disclosure, antenna slot gaps 7 of one of the receiving channels and its corresponding transmitting channel have a same main-axis direction.

In one embodiment of the present disclosure, at least one of the receiving channels comprises a plurality of antenna slot gaps 7, the plurality of antenna slot gaps 7 are disposed in a staggered manner on two sides of the symmetry axis of the integrated waveguide structure surrounding the receiving channel, and/or, at least one of the transmitting channels comprises a plurality of antenna slot gaps 7, the plurality of antenna slot gaps 7 are disposed in a staggered manner on two sides of the symmetry axis of the integrated waveguide structure surrounding the transmitting channel.

In one embodiment of the present disclosure, antenna slot gaps 7 of one of the receiving channels and antenna slot gaps 7 of said receiving channel's corresponding transmitting channel are mirror-symmetrical.

Figure 5:
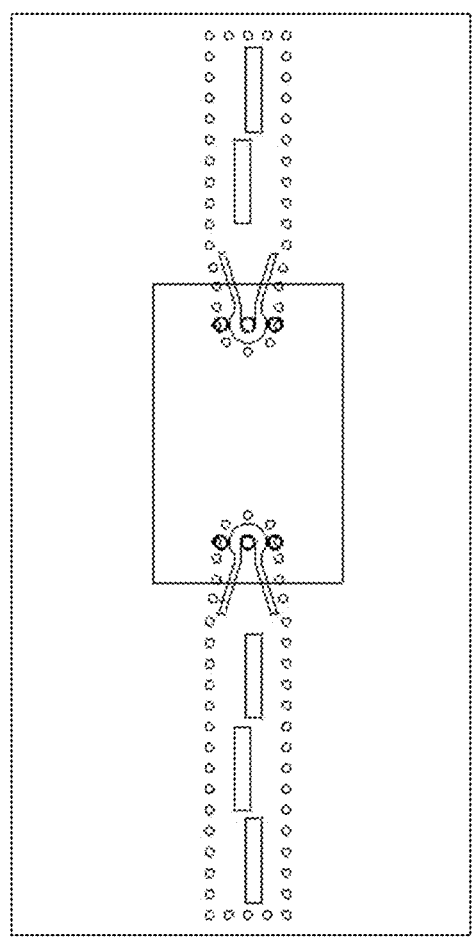
FIG. 5 is a schematic structural diagram of an RF front-end module for a millimeter-wave radar according to another embodiment of the present disclosure.
Figure 6:
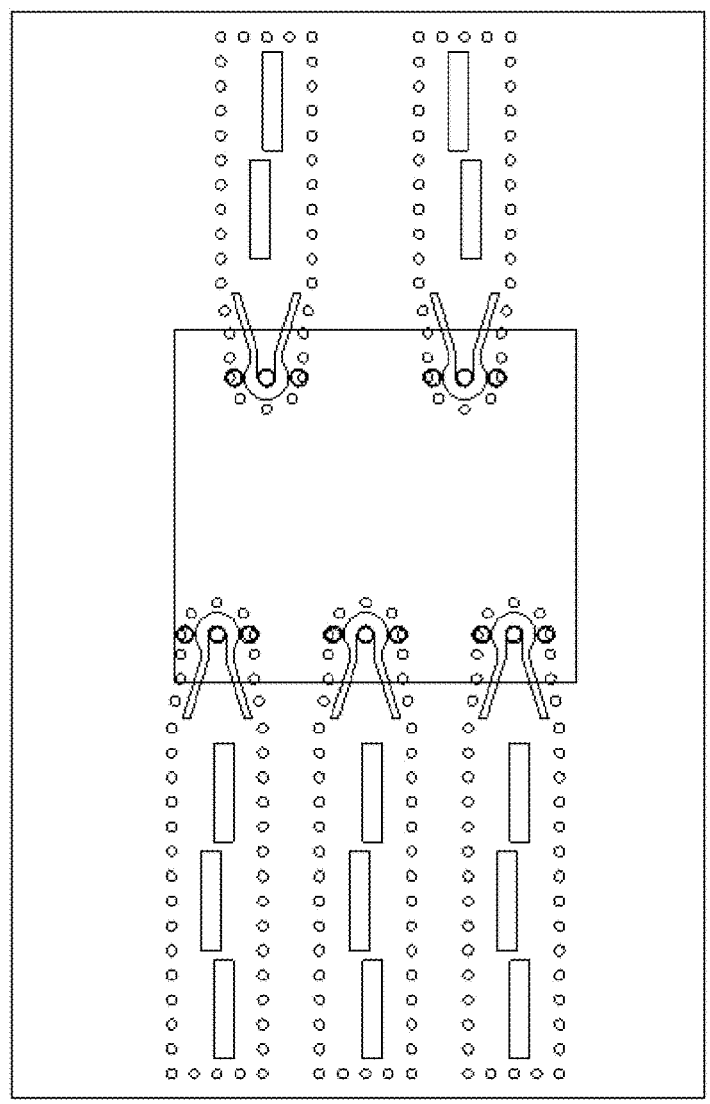
FIG. 6 is a schematic structural diagram of an RF front-end module for a millimeter-wave radar according to yet another embodiment of the present disclosure.

The following sections will further explain the RF front-end module of the present disclosure with reference to FIGS. 5 and 6. As shown in FIG. 5, the RF front-end module comprises one receiving channel above and one transmitting channel below. The receiving channel comprises two rectangular antenna slot gaps 7, arranged in a staggered manner on two sides of the symmetry axis. The transmitting channel comprises three rectangular antenna slot gaps 7, arranged in a staggered manner on two sides of the symmetry axis of the integrated waveguide structure surrounding the transmitting channel. Preferably, center points of the rectangular antenna slot gaps 7 within the same channel are equidistant from the symmetry axis of the integrated waveguide structure surrounding said channel.

FIG. 6 is a schematic structural diagram of an RF front-end module according to another embodiment of the present disclosure. As shown in FIG. 6, the RF front-end module comprises two receiving channels above and three transmitting channels below. Each receiving channel comprises two rectangular antenna slot gaps 7, arranged in a staggered manner on two sides of the symmetry axis of the integrated waveguide structure surrounding the receiving channel. Each transmitting channel comprises three rectangular antenna slot gaps 7, arranged in a staggered manner and symmetrically along the symmetry axis of the integrated waveguide structure surrounding the transmitting channel. One of the receiving channels and its corresponding transmitting channel are mirror-symmetrical, and the pair can be cascaded with multiple chips 1 for collaborative signal reception and transmission. Please note that the term "mirror-symmetrical" between each pair of receiving and transmitting channels refers to the antennas being oriented in a mirror-like fashion. For example, if the receiving antenna faces east, the corresponding transmitting antenna will face west, creating a mirrored directional alignment. Additionally, when multiple chips are connected in a cascading system, their respective receiving and transmitting channels can also be cascaded. For instance, a single chip with two receiving channels and two transmitting channels, when cascaded with another chip, results in a system with four cascaded receiving channels and four cascaded transmitting channels, thereby enhancing the radar's functionality and performance.

It is worth noting that, the design of the antenna slot gaps 7 ensures that the planned directions of the receiving and transmitting channels match, which facilitates correct signal reception and demodulation by the receiving antenna, further reducing alignment and calibration complexity, improving system stability and reliability, and minimizing waveguide loss. The staggered arrangement of the antenna slot gaps 7 reduces mutual interference between the antenna slot gaps, enhancing system stability and increasing fault tolerance.

In one embodiment of the present disclosure, the antenna slot gaps 7 comprise one or more of rectangular slot gaps, elliptical slot gaps, pentagonal slot gaps, and hexagonal slot gaps.

In actual industrial production, it is challenging to etch ideal rectangular antenna slot gaps due to manufacturing limitations and physical factors. The edges of may be curved, but small deviations typically do not significantly affect performance. Therefore, as long as the antenna slot gaps conform to the design principles outlined in the present disclosure, the antenna can still function properly and achieve the desired technical effects. The present disclosure does not intend to restrict the specific shape and structure of the antenna slot gaps 7. The listed rectangular slot gaps, elliptical slot gaps, pentagonal slot gaps, and hexagonal slot gaps are for explanatory purposes only.

Preferably, the rectangular antenna slot gaps 7 exhibit good polarization purity and allow frequency response adjustments by altering the rectangle's length and width, facilitating performance adjustments. Additionally, the rectangular slot gaps have excellent radiation characteristics, achieving high radiation efficiency and directivity.

The radar system of the present disclosure comprises a power supply unit and an RF front-end module. The RF front-end module is an RF front-end module for a millimeter-wave radar as described in any one of the above embodiments of the present disclosure.

Figure 7:
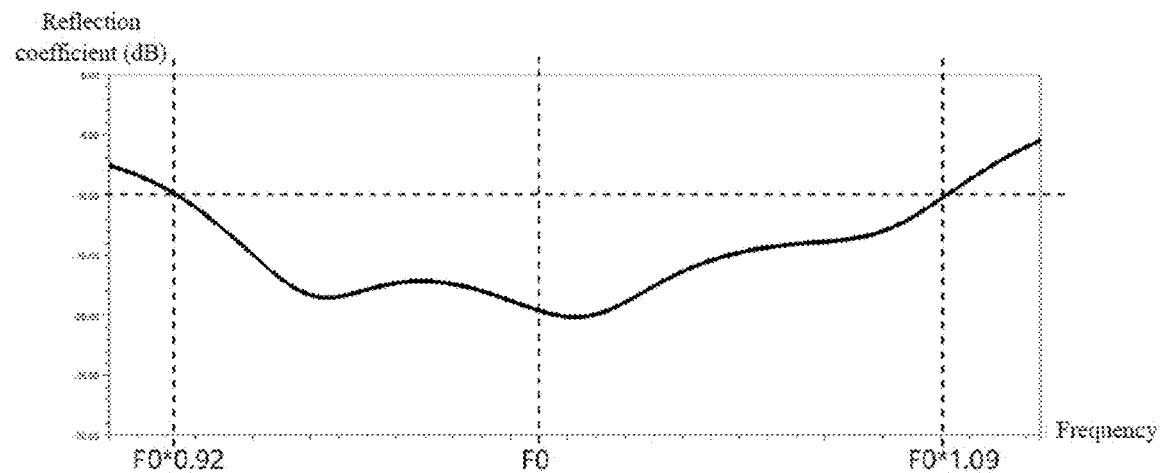
FIG. 7 is a diagram depicting a relationship between frequency and reflection coefficient of an RF front-end module for a millimeter-wave radar according to an embodiment of the present disclosure.
Figure 8:
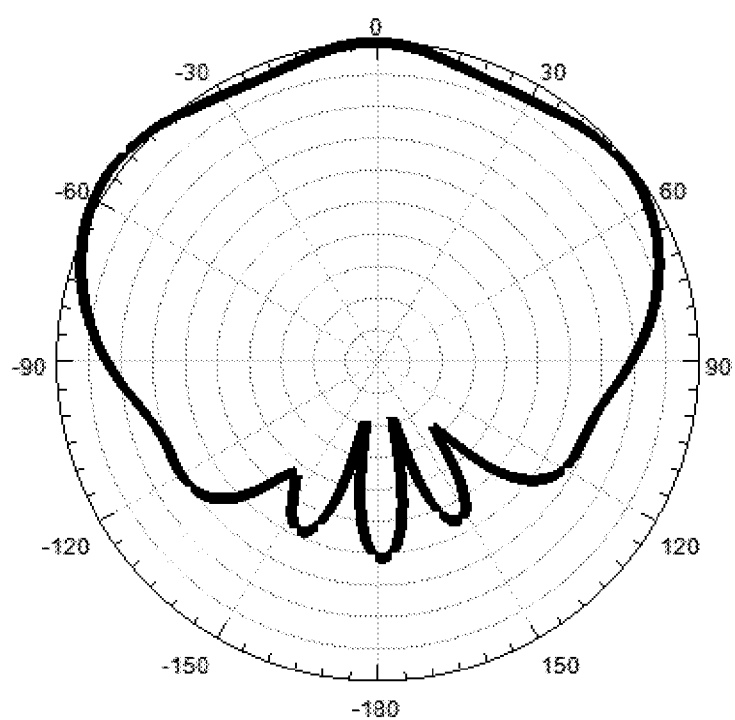
FIG. 8 is a diagram illustrating an antenna radiation pattern of an RF front-end module for a millimeter-wave radar according to an embodiment of the present disclosure.

FIG. 7 is a diagram depicting a relationship between frequency and reflection coefficient of the RF front-end module of the present disclosure. FIG. 8 is a diagram illustrating an antenna radiation pattern of the RF front-end module of the present disclosure. As shown in FIG. 7, when the reflection coefficient of the RF front-end module is −10 dB, the present disclosed RF front-end module achieves a relative bandwidth of 17%, which is significantly greater than that of typical modules. As shown in FIG. 8, the present disclosed RF front-end module achieves a −3 dB beamwidth of 150 degrees, which is significantly greater than typical modules. The RF front-end module of the present disclosure greatly enhances the reflection coefficient bandwidth and beamwidth, thereby significantly improving detection accuracy and range, especially suitable for high-precision and wide-angle radar antenna applications.

In summary, by placing at least one receiving channel and at least one transmitting channel between two metal plates, configuring both the receiving channel and the transmitting channel to be RF-connected to the chip and surrounded by several metalized through holes, and arranging several antenna slot gaps corresponding to each receiving and transmitting channel on the upper metal plate, the RF front-end module of the present disclosure offers wider beamwidth, larger reflection coefficient bandwidth, symmetrical radiation patterns, and a larger field of view, enabling advantages such as stable matching, efficient transmission, accurate targeting, and broad monitoring areas, especially suitable for high-precision, wide-angle radar antenna applications. Existing patch microstrip antennas are limited by size and simple structure and cannot achieve these effects. Therefore, the RF front-end module of the present disclosure resolves the challenges associated with designing a broadside antenna radar module with wide bandwidth, high performance, and a wide field of view using conventional patch microstrip antennas. Therefore, the present disclosure effectively overcomes various shortcomings of the prior art and has a high industrial value.

The above-mentioned embodiments only exemplarily illustrate the principles and effects of the present disclosure, but are not used to limit the present disclosure. Modifications or variations of the above-described embodiments may be made by those skilled in the art without departing from the spirit and scope of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. An RF front-end module for a millimeter-wave radar, comprising:

a chip; and an antenna unit, comprising an upper metal plate and a lower metal plate, wherein one or more receiving channels and one or more transmitting channels are disposed between the upper metal plate and the lower metal plate, and at least one of the receiving channels corresponds to one of the transmitting channels, wherein antenna slot gaps of one of the receiving channels and its corresponding transmitting channel are mirror-symmetrical;

wherein the receiving channels and the transmitting channels are RF-connected to the chip to respectively receive and transmit RF signals;

wherein each of the receiving channels and the transmitting channels is surrounded by metalized through holes, and each of the metalized through holes penetrates the upper metal plate and the lower metal plate; wherein for each of the receiving channels and the transmitting channels, a subset of the metalized through holes forms an integrated waveguide structure surrounding said channel, wherein for each of the receiving channels and the transmitting channels, a distance between a center point of an antenna slot gap at a tail end of said channel and the metalized through holes at the tail end of said channel is one-half of a waveguide wavelength of the integrated waveguide structure surrounding said channel;

wherein the upper metal plate is provided with antenna slot gaps, and each of the antenna slot gaps corresponds to one of the receiving channels and the transmitting channels;

wherein for each receiving channel, a center point of a corresponding antenna slot gap does not coincide with a symmetry axis of the integrated waveguide structure surrounding the receiving channel, and/or, for each transmitting channel, a center point of a corresponding antenna slot gap does not coincide with a symmetry axis of the integrated waveguide structure surrounding the transmitting channel;

wherein after receiving the RF signals, the receiving channels transmit the RF signals between the upper metal plate and the lower metal plate through a transition line, wherein a first end of the transition line has an RF transmission line and a second end of the transition line has a trapezoidal transition transmission line, wherein the RF signals are transmitted to integrated waveguide structures formed by the metalized through holes.

2. The RF front-end module for the millimeter-wave radar according to claim 1, wherein antenna slot gaps of one of the receiving channels and its corresponding transmitting channel have a same main-axis direction.

3. The RF front-end module for the millimeter-wave radar according to claim 1, wherein at least one of the receiving channels comprises a plurality of antenna slot gaps, the plurality of antenna slot gaps are disposed in a staggered manner on two sides of the symmetry axis of the integrated waveguide structure surrounding the receiving channel, and/or, at least one of the transmitting channels comprises a plurality of antenna slot gaps, the plurality of antenna slot gaps are disposed in a staggered manner on two sides of the symmetry axis of the integrated waveguide structure surrounding the transmitting channel.

4. The RF front-end module for the millimeter-wave radar according to claim 1, wherein a distance between two adjacent metalized through holes is one fourth of a waveguide wavelength of the integrated waveguide structure surrounding said channel.

5. The RF front-end module for the millimeter-wave radar according to claim 1, wherein the antenna slot gaps comprise one or more of rectangular slot gaps, elliptical slot gaps, pentagonal slot gaps, and hexagonal slot gaps.

6. The RF front-end module for the millimeter-wave radar according to claim 1, wherein the channels are RF-connected to the chip by a GSG RF connection or a GS RF connection.

7. A radar system, comprising:
a power supply unit; and
an RF front-end module for a millimeter-wave radar according to claim 1.

* * * * *